July 3, 1934.  C. E. L. LIPMAN  1,965,419
MUFFLER AND PRESSURE UNLOADER
Filed April 1, 1931  3 Sheets-Sheet 1

Witness:
R. B. Davison.

Inventor:
Carl E. L. Lipman
By Wilson, Dowell, McCanna & Kelsen
Attys

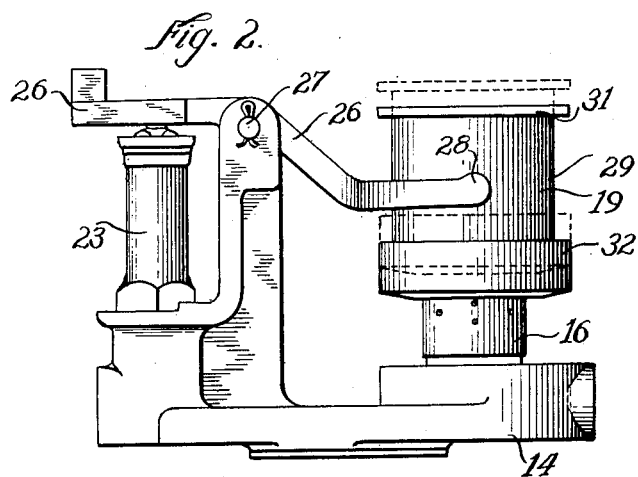
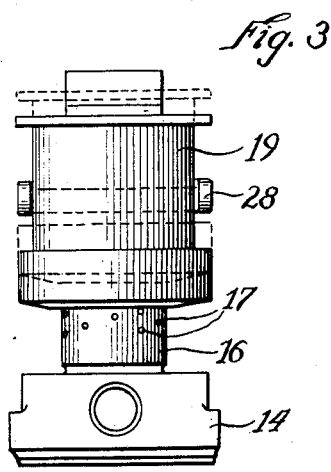
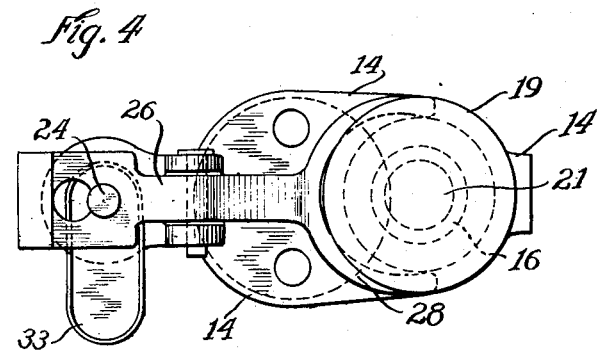
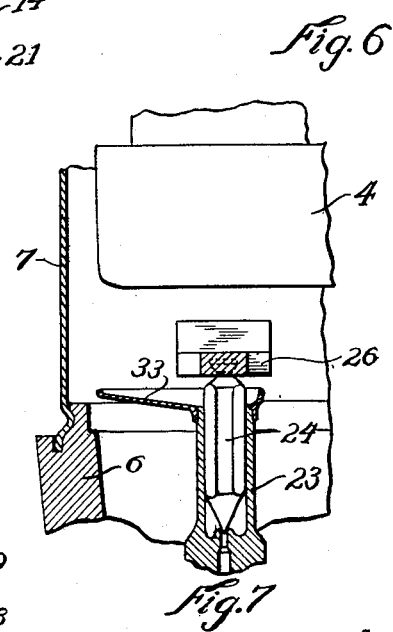
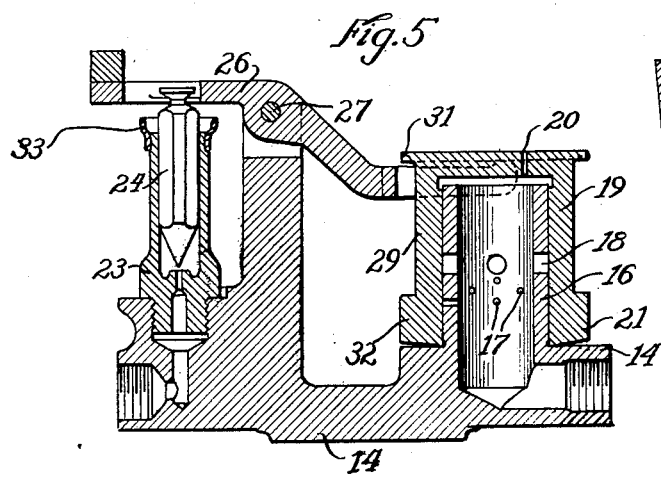
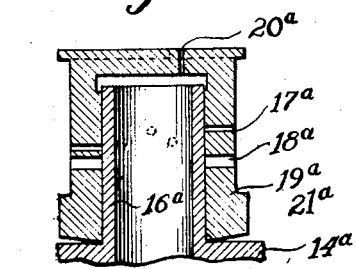

July 3, 1934.     C. E. L. LIPMAN     1,965,419
MUFFLER AND PRESSURE UNLOADER
Filed April 1, 1931     3 Sheets-Sheet 3
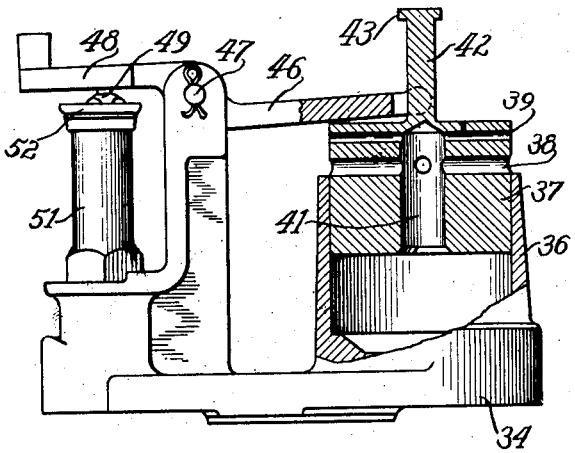
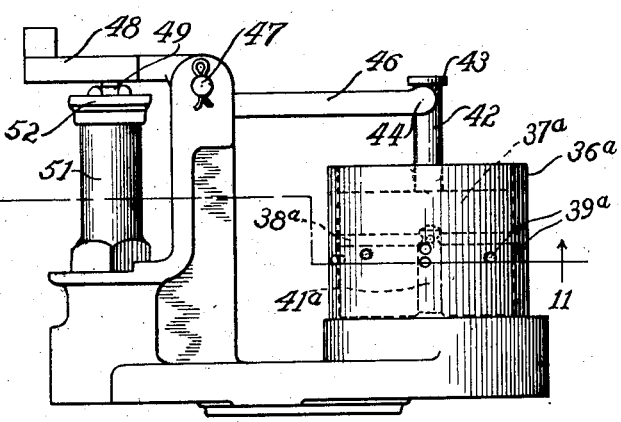
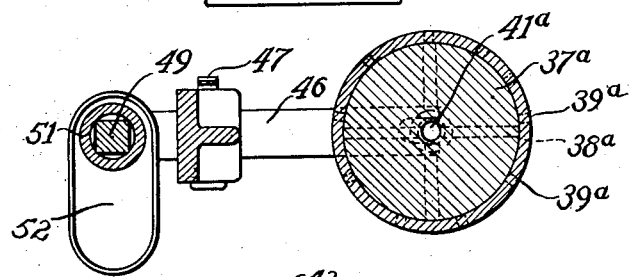
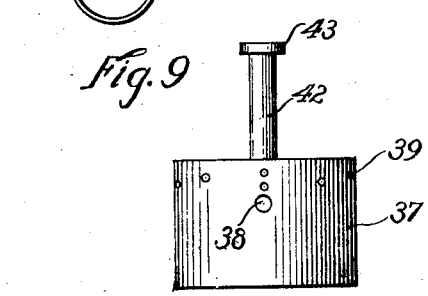
Witness:
R. B. Davison
Inventor:
Carl E. L. Lipman
By Wilson, Bowell, McCown & Rehm
Atty's Patented July 3, 1934

1,965,419

UNITED STATES PATENT OFFICE 1,965,419

MUFFLER AND PRESSURE UNLOADER

Carl E. L. Lipman, Chicago, Ill., assignor to Lipman Patents Corporation, Chicago, Ill., a corporation of Delaware Application April 1, 1931, Serial No. 526,811

2 Claims. (Cl. 230—24)

This invention relates to refrigerating systems of the compressor condenser evaporator type and while the invention is illustrated as applied to a sealed refrigerating system it will be apparent that many of the features of this invention may be applied to other mechanisms.

In this type of system particularly in those applications thereof in which the motor compressor unit is hermetically sealed within a casing, it is desirable and often necessary for the proper and successful operation of the system to reduce the pressure of the high side prior to starting the driving motor to unload the motor and thereby permit the utilization of a motor most efficient for the normal working load. It is also desirable to muffle any noises caused by the discharged fluids from the compressor.

The first feature is particularly desirable in sealed units wherein it is necessary to use a motor of as low capacity and small size as possible. In reducing the pressure upon the high side of the compressor in a refrigerating system it is also necessary of course to prevent the relatively warm refrigerant from passing back through the suction line into the low side and into the evaporating unit otherwise the reverse flow of refrigerant will transfer heat into the expansion or evaporating element and result in considerable loss in efficiency. The second feature is also particularly desirable in sealed units especially where such units are employed in a household refrigerator where it is desirable to have extremely quiet operation.

It is therefore an object of this invention to provide both an unloading mechanism and a muffling means for a motor compressor unit and to combine these elements as a small unitary compact structural element.

It is also an object of this invention to provide a muffing device which is automatically responsive to varying operating conditions of the motor compressor unit.

It is a still further object of this invention to provide a muffling mechanism which may be employed as the actuating means for the unloading element.

In accordance with this invention a muffling valve is connected to the discharge side of the compressor in such a manner as to automatically control the discharged fluid. The movement of the muffling valve is employed to actuate an unloading mechanism, the latter being preferably in the form of a valve controlling a by-pass between the high and low sides of the compressor.

Other and further objects and their accompanying advantages will be apparent from the following description given in connection with the drawings, in which:

Fig. 2 is a side elevation of the unloading and muffler unit.

Fig. 3 is an end elevation of the unloading and muffler unit.

Fig. 4 is a plan view of the unloader muffler.

Fig. 5 is a vertical section through the unloader and muffler.

Fig. 6 is a fragmentary section illustrating the location of the unloading and muffler unit.

Fig. 7 is a fragmentary section illustrating a modified form of muffler valve.

Fig. 8 is a side elevation partly in section, of a still further modified form of muffling valve.

Fig. 9 is a side elevation of the piston valve illustrated in Fig. 8.

Fig. 10 is a side elevation of a still further modified form of muffler valve unit.

Fig. 11 is a section on line 11—11 of Fig. 10.

Figure 1:
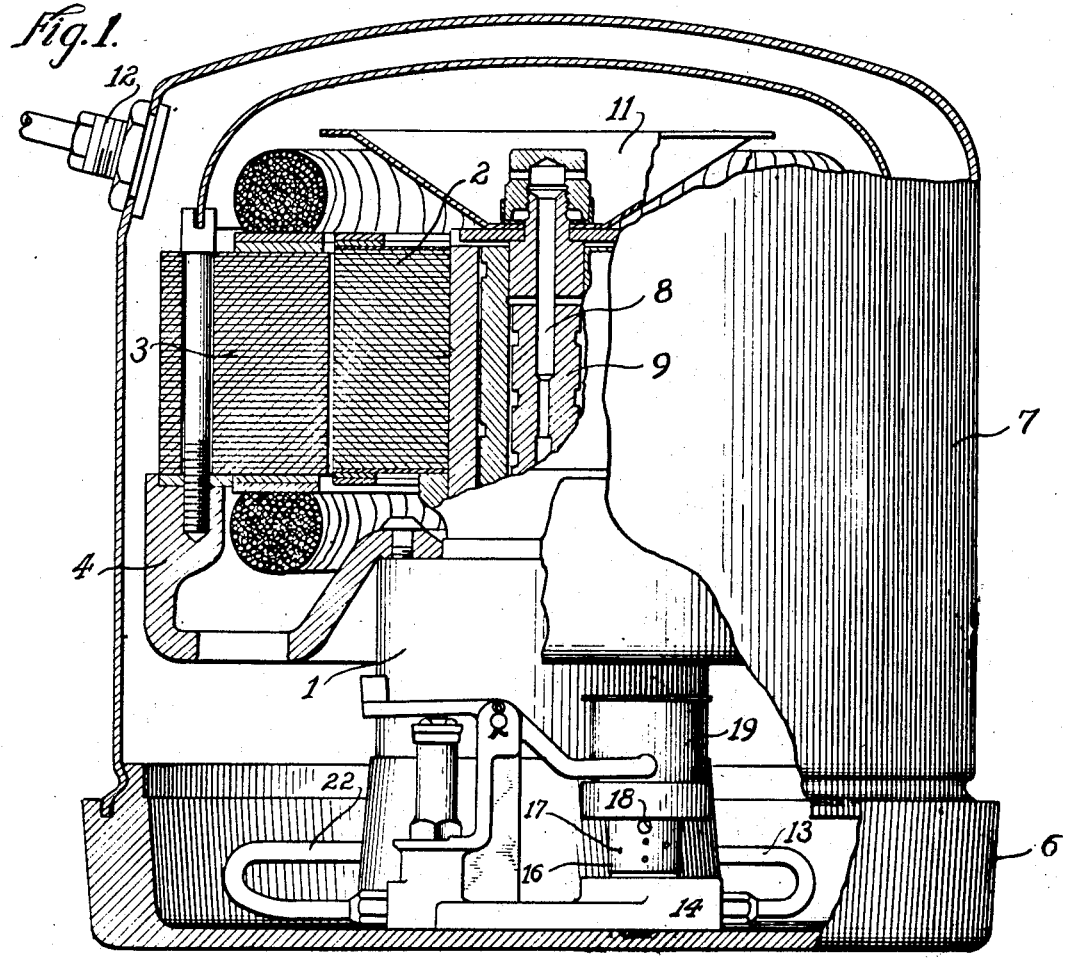
Fig. 1 is a side elevation of a motor compressor unit partly in section to illustrate the interior construction thereof.

Referring particularly to Fig. 1, it may be seen that the motor compressor unit comprises a compressor 1 operatively connected to the rotor 2 of an electric motor, the stator 3 of which is carried upon a spider 4 supported by the compressor housing. The entire mechanism is supported upon a base 6 and is enclosed by a casing or dome 7. The compressor is arranged to discharge the compressed refrigerant into the interior of the dome and the lubricating oil through a center bore 8 formed in the shaft 9. The oil forced through the bore 8 is thrown outwardly against a baffle or deflector 11 and will drip down into the sump of the base. The refrigerant will pass out through a connection 12. It is understood of course that the entire interior of the dome is under the pressure of the high side of the compressor.

In the illustrated form of this invention a portion, at least, and preferably all, of the refrigerant discharged from the compressor is conducted through a tube 13 into the base 14 of an unloading and muffling unit. Upon the base 14 is mounted a hollow piston-like member 16, the interior of which is in communication with tube 13. The piston is provided with a series of relatively small apertures 17 through the wall thereof and preferably with at least one larger aperture 18 to take care of possible slugs of oil. Slidably mounted upon the piston is a sleeve or cylinder 19 arranged to cover the ports 17 and 18 when in lower position and to uncover these ports when in upper or open position. The end of the sleeve is provided with a small aperture 20 to prevent air binding of the cylinder in its movements. The lower edge of the cylinder is also beveled as at 21 to prevent sticking of the cylinder. It will be apparent that as the pressure of the high side of the compressor increases, sleeve 19 will be automatically raised to uncover ports 17 and 18 and will assume a variable position in accordance with varying pressures of the compressor. The piston-like valve comprising the piston 16 and sleeve 19 will therefore have a metering and a muffling action.

The movement of cylinder 19 in response to varying pressures of the discharged refrigerant is utilized to actuate an unloading valve as will now be described. The suction or low pressure side of the compressor is tapped to permit the connection of a by-pass tube 22 which is connected at its other end to the base 14 at a position removed from the point of connection of tube 13. Secured to base 14 and in communication with tube 22 is a valve casing 23 within which seats a valve member 24. A lever 26 pivoted intermediate its ends at 27 to the base 14 is provided with a yoke 28 at one end which engages a reduced portion 29 of the cylinder 19, the reduced portion being terminated by an upper flange 31 and a lower flange 32. The flanges 31 and 32 are so spaced as to permit considerable free movement of the cylinder 19 relatively to yoke 28. The other end of lever 26 loosely engages the upper end of valve member 24 so that movements of lever 26 produced by movements of cylinder 19 will raise and lower valve member 24.

It follows from the foregoing that whenever cylinder 19 drops into its lowermost position due to inoperativeness of the compressor, lever 26 will be moved clockwise about its pivot and raise valve member 24 thus establishing communication between the low and high pressure sides of the compressor through tube 22. In order to thoroughly lubricate valve member 24 and effectively seal the same, a drip pan 33 is secured to the upper end of valve casing 23 which pan collects some of the oil dripping from the stator 3 and directs the oil around valve member 24.

In Fig. 7 there is shown a slight modification of the muffling valve in that the piston 16a is imperforate and ports 17a and 18a corresponding to ports 17 and 18 of the previous form are provided in the cylinder. As in the prior form the lower edge of the piston is chamfered as at 21a to prevent sticking of the cylinder in its movements.

In Figs. 8 and 9, there is shown a still further form of muffling valve, in which the base 34 is provided with an integral cylinder 36 within which a piston valve 37 reciprocates. The piston 37 is provided with a series of large ports 38 and small ports 39 all leading to a center bore 41. It is apparent that as the piston is raised by the pressure of the refrigerant from the compressor the ports will be uncovered and permit the escape of the refrigerant by a metering action. The upper end of the piston is provided with a stem 42 capped with a flange 43 which is engaged by the forked end 44 of a lever 46 pivoted at 47 to a standard arising from the base. The other end 48 of the lever engages a valve element 49 mounted within a valve casing 51 in a manner similar to that previously described. A drip pan 52 is also provided to collect oil and lubricate the valve member 49.

In Figs. 10 and 11 there is shown a muffling valve and unloading valve constructed in a manner similar to that shown in Figs. 8 and 9 but in this instance the ports 39a corresponding to ports 39 in the former modification are formed in the cylinder 36a instead of being formed in the piston 37a. The piston is bored as at 41a and provided with large transverse ports 38a corresponding to ports 38 which permit the passage of slugs of oil should the same enter cylinder 36a.

Figure 12:
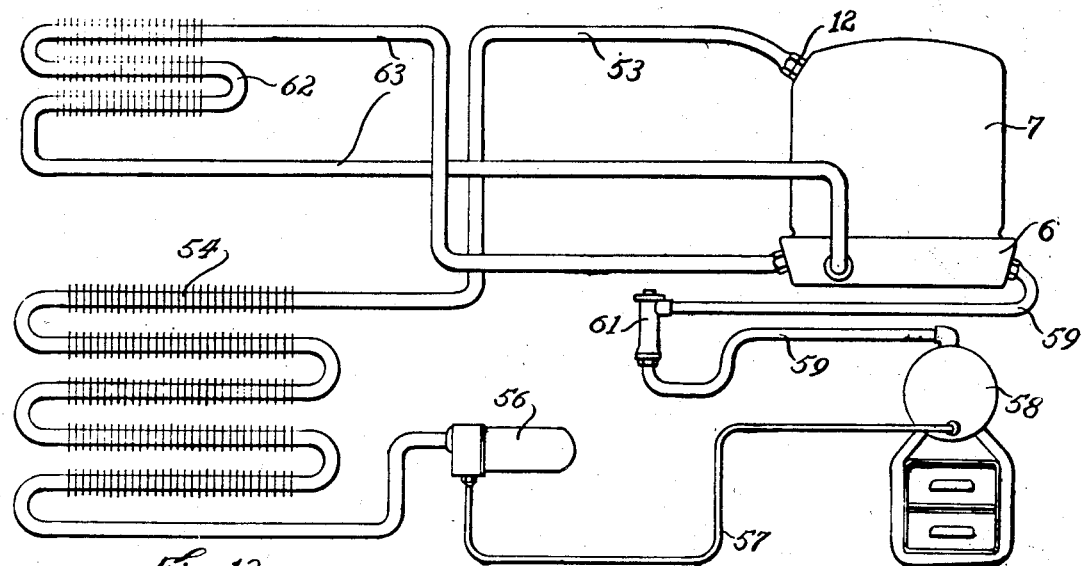
Fig. 12 is a schematic illustration of a complete refrigerating system.

In Fig. 12 there is illustrated a complete refrigerating system in which the motor compressor unit delivers refrigerant through connection 12 to a refrigerant circulatory system including connecting pipe 53 which conducts the compressed refrigerant under pressure to a condenser 54 which liquefies the same in which form it passes to a high pressure float chamber 56. From the high pressure float chamber 56, the liquid refrigerant passes through the liquid line 57 to the evaporator 58. From the evaporator 58, the refrigerant then in vapor form is withdrawn through a suction line 59 in which is inserted a check valve 61. The check valve prevents return flow of the refrigerant through the suction line into the evaporator during idle periods when the pressures upon the high and low sides of the system have been substantially equalized. In the illustrated refrigerating system the lubricated oil or a portion thereof is circulated through an oil cooler 62 by connecting pipes 63.

From the foregoing disclosure it will be seen that there has been provided means for unloading the compressor actuated by the pressure of the discharge side of the compressor, the actuating means being so constructed as to meter the discharge of refrigerant under pressure and muffle any noises which would otherwise normally occur. It is also apparent that the combination of unloading and muffling mechanism provides for a structural unit which may be manufactured and assembled as such. It is obvious that the unit may be conveniently installed within the sealed motor compressor unit or may be inserted externally of the unit if desired within a suitable housing.

It is also obvious that other changes may be made in the details of construction and arrangement without departing from the spirit and scope of this invention as defined in the claims.

I claim:

1. A motor compressor unit comprising a compressor, a dome enclosing the compressor and providing a hermetically sealed high pressure chamber surrounding the compressor, a passage adapted to establish communication between said chamber and the suction side of said compressor, an unloading valve adapted to close said passage, a muffling valve connected to the delivery passage from the compressor through which the compressed fluid delivered by the compressor is discharged, said muffling valve comprising a cylinder member and a plunger member telescopically associated to be relatively movable under the influence of pressure delivered by said compressor, one of said members being provided with delivery ports through which said pressure is discharged when said members assume a predetermined relative position, said movable member being gravity actuated toward closed position, and a pivoted lever establishing connection between said unloading valve and a movable member of said muffling valve through which said unloading valve is actuated by the muffling valve.

2. A motor compressor unit comprising a compressor having suction and discharge pipes, a dome enclosing the compressor and providing a hermetically sealed high pressure chamber surrounding the compressor and into which the compressor discharges, means for establishing communication between the dome chamber and the suction pipe of said compressor, an unloading valve arranged to control said communication, a muffling valve comprising telescopically arranged relatively movable members, one of which is provided with perforations adapted to be closed by the other member, the movable member of said muffling valve being actuated by the fluid discharged under pressure from the compressor discharge pipe to uncover said openings, an operative connection between the movable member of said muffling valve and said unloading valve whereby said unloading valve is closed upon fluid actuation of said muffling valve, said muffling valve being provided with a relief opening permitting escape of pressure therefrom when the compressor stops thereby permitting gravity actuation of the movable member of said muffling valve to thereby open said control valve.

CARL E. L. LIPMAN.